No. 846,344. PATENTED MAR. 5, 1907.
W. J. RAFFERTY.
AIR PURIFYING WATER SCREEN.
APPLICATION FILED FEB. 26, 1906.
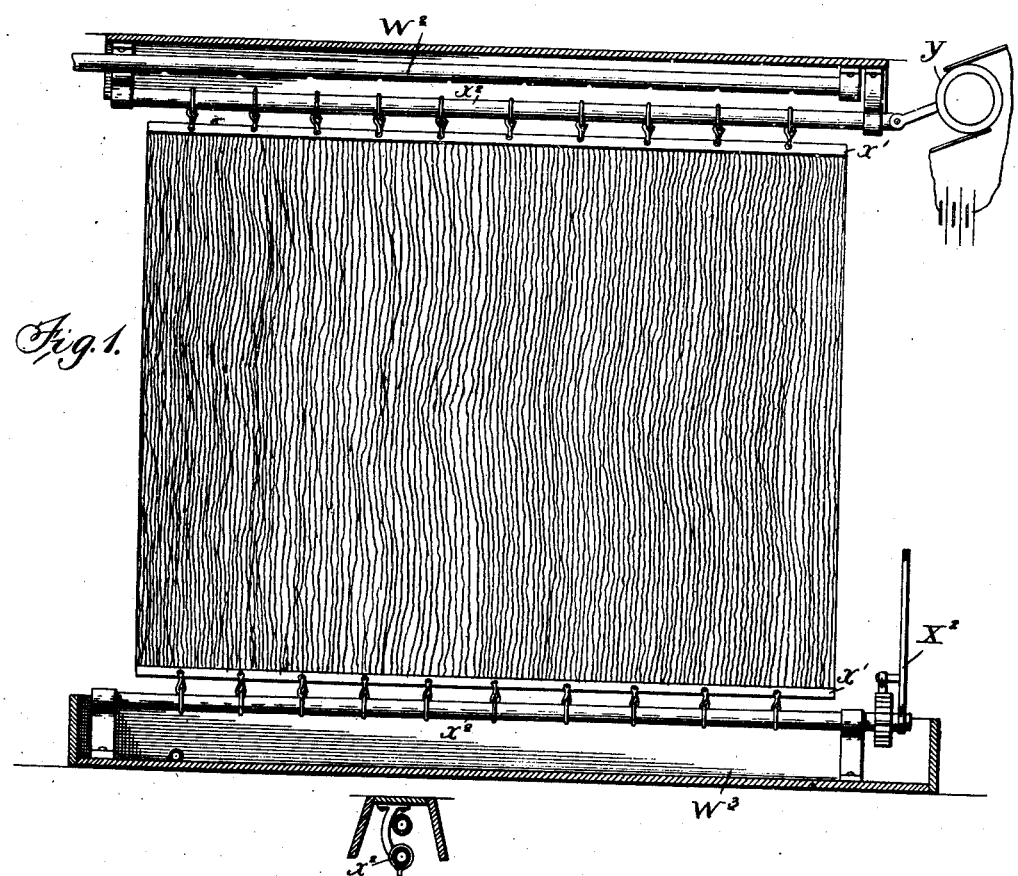

UNITED STATES PATENT OFFICE.

WILLIAM J. RAFFERTY, OF CHICAGO, ILLINOIS.

AIR-PURIFYING WATER-SCREEN.

No. 846,344.     Specification of Letters Patent.     Patented March 5, 1907.

Original application filed February 1, 1905, Serial No. 243,762. Divided and this application filed February 26, 1906. Serial No. 303,075.

*To all whom it may concern:*

Be it known that I, WILLIAM J. RAFFERTY, a citizen of the United States, residing at Chicago, in the county of Cook and State of Illinois, have invented new and useful Improvements in Air-Purifying Water-Screens, of which the following is a specification.

This application is a division of my pending application, Serial No. 243,762, filed February 1, 1905.

It relates particularly to a screen for removing dust and other impurities from air, embodying part of a system for heating, purifying, and distributing air in buildings. The novel features of the screen will be apparent from the following description and claims and the accompanying drawings.

In the drawings, Figure 1 is a front elevation of the screen. Fig. 2 is a vertical cross-section thereof.

Referring specifically to the drawings, each screen consists, preferably, of a web of loose strands of hemp or suitable fibrous material. These strands are suitably attached to top and bottom strips $x'$, provided with snap-hooks for connecting the same to supporting rods or rollers $x^2$.

Water is supplied to the screen from a pipe $W^2$ above the same, which has a series of perforations, so as to continuously sprinkle the screen with water which drips down over the strands. Any dust, soot, or other impurities in the air which passes through the screen is taken up by the water which flows from the screen to a trough $W^3$ thereunder and thence to waste-pipe.

$X^2$ is a lever with pawl-and-ratchet connection to the roller $x^2$ for drawing the screen taut.

The screen is vibrated laterally by means of a vibrator consisting of an electric motor $Y$, having a crank connection with the end of the upper rod $X^2$. This rod is loosely mounted in its hangers, so that the screen is vibrated across the direction of the air-current, and the dust from the air is more effectively collected than if the screen were stationary.

Instead of employing strands of hemp to form the curtain, as shown, the same may be made of perforated metal with slight corrugations, down which the water will flow, or of woven wire, wood, or other suitable material.

The apparatus is capable of summer use for moistening, purifying, and cooling the air, which is allowed to flow through the screens, which, being supplied with cold water, will cool the air, as well as performing the other functions indicated.

I claim—

1. An air purifying and moistening apparatus, comprising a passage through which the air flows, a sheet permeable to air, and having a flow of water thereover, extending across said passage, and means to vibrate the sheet.

2. In an air purifying and moistening apparatus, the combination with a screen through which the air passes, and having a flow of water thereover, of means to vibrate the screen.

3. In an air purifying and moistening apparatus, the combination with a screen through which the air passes, of a water-pipe above the screen having a series of perforations from which water flows down over the screen, and means to vibrate the screen laterally.

In testimony whereof I have signed my name to this specification in the presence of two subscribing witnesses.

WILLIAM J. RAFFERTY.

Witnesses:
    SIGNA FELTSKOG,
    H. G. BATCHELOR.